United States Patent
Ismail et al.

(10) Patent No.: US 7,729,435 B2
(45) Date of Patent: Jun. 1, 2010

(54) NULL DETECTION IN DAB, T-DMB, AND DAB-IP SYSTEMS

(75) Inventors: Mahmoud H. Ismail, Cairo (EG); Waleed Youris, Foothill Ranch, CA (US); Maged F. Barsoum, Los Angeles, CA (US); Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 535 days.

(21) Appl. No.: 11/834,712

(22) Filed: Aug. 7, 2007

(65) Prior Publication Data

US 2009/0041135 A1 Feb. 12, 2009

(51) Int. Cl.
*H04K 1/10* (2006.01)
*H04L 27/28* (2006.01)

(52) U.S. Cl. .................. 375/260; 375/142; 375/150; 375/343

(58) Field of Classification Search ............. 375/142, 375/150, 260, 343; 370/203–211
See application file for complete search history.

(56) References Cited

U.S. PATENT DOCUMENTS 6,836,518 B1 * 12/2004 Sano et al. .......... 375/343
7,020,116 B1 * 3/2006 Nakada .............. 370/338

* cited by examiner

*Primary Examiner*—Curtis B Odom
(74) *Attorney, Agent, or Firm*—Rahman LLC (57) ABSTRACT

Detecting Null symbols in a video data frame comprises sending OFDM symbols through a sliding windowed correlation process having a correlation window length proportional to a cyclic prefix length and a delay equal to a FFT size of the symbols, wherein output peaks of the process occur where two similar portions of the symbols coincide; checking peaks in windows sized equal to a duration of a symbol; determining whether the peaks are located in the middle of the windows; determining whether a shift has occurred in the location of the peak of a current window compared to in a second immediately previous window; determining whether the peak in a first immediately previous window is weak compared to that in a second immediately previous window; and declaring that a Null symbol exists in the first previous window when the shift has occurred and the determination of a weak peak exists.

20 Claims, 9 Drawing Sheets

samples

NULL DETECTION IN DAB, T-DMB, AND DAB-IP SYSTEMS

BACKGROUND

1. Technical Field

The embodiments herein generally relate to mobile television (TV) technologies, and, more particularly, to null symbol detection in data frames transmitted on Digital Audio Broadcasting (DAB), Terrestrial Digital Multimedia Broadcasting (T-DMB), and Digital Audio Broadcasting—Internet Protocol (DAB-IP) mobile TV standards.

2. Description of the Related Art

In the DMB mobile TV standard, each data frame consists of a number of data symbols in addition to a Null symbol and a phase reference symbol. Generally, the Null symbol is an all-zero transmission and it signals the start of the DMB frame. The presence of the Null symbol needs to be detected with great accuracy in order to achieve perfect synchronism with the transmitter and consequently, for the DMB receiver to work properly.

The traditional approach for detecting the presence of the Null symbol is based on detecting the energy of each received symbol. If the energy is below a specific pre-determined threshold, then a Null symbol is declared to be present. The main disadvantage of this approach is that it is not robust to noise and multipath in addition to the fact that the choice of the threshold value tends to require a lot of effort to be optimized for all different scenarios. Accordingly, there remains a need for a new technique for Null symbol detection in digital video data frames.

SUMMARY

In view of the foregoing, an embodiment herein provides a method of detecting Null symbols in a video data frame and a program storage device readable by computer comprising a program of instructions executable by the computer to perform the method of detecting Null symbols in a video data frame, wherein the method comprises receiving orthogonal-frequency-division-multiplexing (OFDM) symbols; sending the OFDM symbols through a sliding windowed correlation process having a correlation window length proportional to a cyclic prefix length and a delay equal to a Fast Fourier Transform (FFT) size of the OFDM symbols, wherein peaks of the output of the sliding windowed correlation process occur at locations where two similar portions of the OFDM symbols coincide; checking peaks in windows of a size equal to a duration of an OFDM symbol; determining whether the peaks are located in a middle region of the windows; determining whether a shift has occurred in the location of the peak of a current window (i) as compared to that in a second immediately previous window (i-2); determining whether the peak in a first immediately previous window (i-1) is weak compared to that in a second immediately previous window (i-2); and declaring that a Null symbol exists in the first immediately previous window (i-1) when the shift has occurred and the determination of a weak peak exists.

In one embodiment, the window where the peaks are checked consist of the first two windows. Moreover, the method may further comprise shifting edges of the windows to ensure the peaks lie within the middle region of the windows. In one embodiment, the correlation window length is equal to the cyclic prefix length. In another embodiment, the correlation window length is double the cyclic prefix length. The checking process may comprise detecting a maximum peak in the current window for a period not less than three symbol durations, wherein the method may further comprise establishing the maximum peak as a center of the current window; and finding peaks in all successive windows for a number of data symbols equal to the number of symbols in the video data frame. Additionally, the method may further comprise locating a window with a minimum value of the peak; and establishing the window with the minimum value of the peak as the Null symbol.

Another embodiment provides a system for detecting Null symbols in a video data frame, wherein the system comprises a receiver adapted to receive OFDM symbols; a sliding window correlator adapted to process the OFDM symbols, wherein the sliding window correlator comprises a correlation window length proportional to a cyclic prefix length and a delay equal to a FFT size of the OFDM symbols, wherein peaks of the output of the sliding windowed correlation process occur at locations where two similar portions of the OFDM symbols coincide; and a processor adapted to check peaks in windows of a size equal to a duration of an OFDM symbol; determine whether the peaks are located in a middle region of the windows; determine whether a shift has occurred in the location of the peak of a current window (i) as compared to that in a second immediately previous window (i-2); determine whether the peak in a first immediately previous window (i-1) is weak compared to that in a second immediately previous window (i-2); and declare that a Null symbol exists in the first immediately previous window (i-1) when the shift has occurred and the determination of a weak peak exists.

In one embodiment, the window where the peaks are checked consist of the first two windows. Additionally, the processor may be further adapted to shift edges of the windows to ensure the peaks lie within the middle region of the windows. Furthermore, in one embodiment, the correlation window length is equal to the cyclic prefix length. In another embodiment, the correlation window length is double the cyclic prefix length. Moreover, the checking process may comprise detecting a maximum peak in the current window for a period not less than three symbol durations, wherein the process is further adapted to establish the maximum peak as a center of the current window; find peaks in all successive windows for a number of data symbols equal to the number of symbols in the video data frame; locate a window with a minimum value of the peak; and establish the window with the minimum value of the peak as the Null symbol.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a new technique for Null symbol detection in digital video data frames. The embodiments herein achieve this by providing two novel approaches for detecting the presence of the Null symbol in the received DMB frames. These two novel methodologies are based on the use of a correlation/moving average process. The embodiments herein may be implemented in digital video broadcast for handheld devices systems, and more particularly, in the baseband chipsets that support mobile TV differentially encoded OFDM standards such as DAB, DAB-IP, and T-DMB.

Referring now to the drawings, and more particularly to FIGS. 1 through 7, where similar reference characters denote corresponding features consistently throughout the figures, there are shown preferred embodiments.

Figure 1:
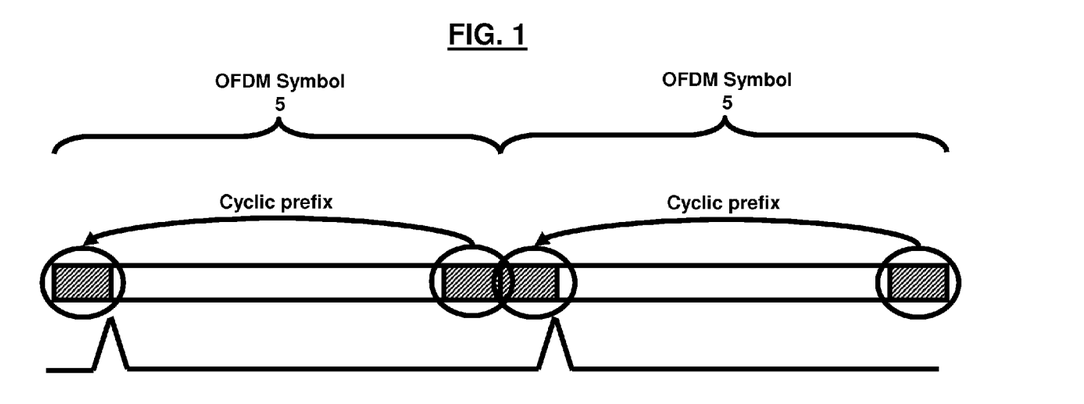
FIG. 1 is a schematic diagram illustrating OFDM symbols according to an embodiment herein.
Figure 2A:
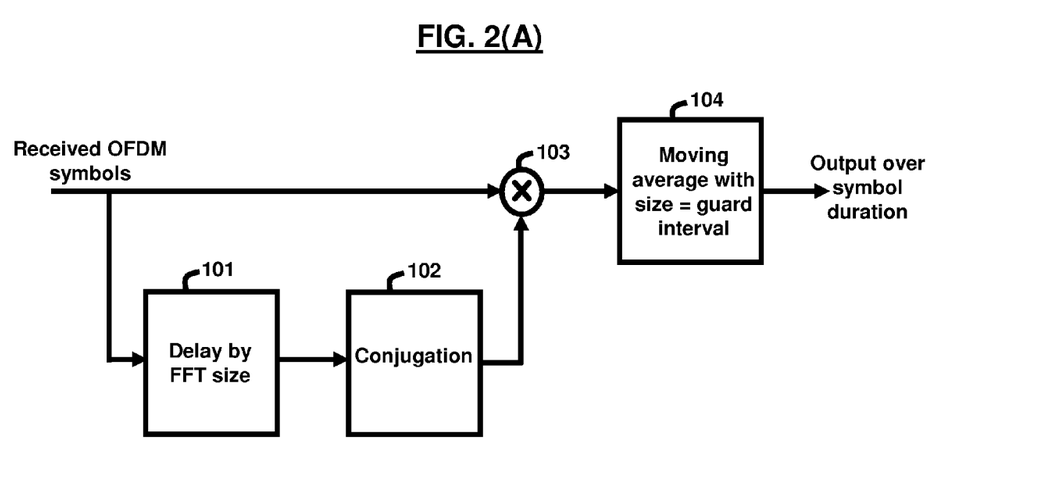
FIGS. 2(A) and 2(B) are block diagrams illustrating successive steps of Null detection according to a first embodiment herein.

As illustrated in FIG. 1, for a regular OFDM symbol 5, peaks are observed at the locations where the two similar portions of the OFDM symbol 5 coincide. According to a first embodiment shown in FIG. 2(A), the received OFDM symbols 5 (of FIG. 1) go through a sliding windowed correlation process with a correlation window length equal to the cyclic prefix length (or guard interval) and a delay equal to the Fast Fourier Transform (FFT) size used (101). The FFT size is effectively the number of carriers used in each OFDM symbol 5. This size depends on which transmission mode of DMB is being used so its value varies according to the choice of the mode of transmission, which can be one of four different values according to the DMB standard. The sliding window correlation process is shown in FIG. 2(A). It is performed by multiplying the stream of received OFDM symbols 5 (of FIG. 1) by a self-version that is delayed 101 by the FFT size as well as conjugated 102 then summing 103 the result over a window of length equal to the cyclic prefix (guard interval) 104. In mathematical terms, assuming that the received stream of OFDM symbols 5 is denoted by x(k), where k is the time index, the FFT size is denoted by N, and the cyclic prefix (or guard interval) length is denoted by $T_g$, then the result of the sliding windowed correlation process, R(n) can be expressed mathematically by:

$$R(n) = \sum_{k=n}^{n+T_g} x(k)x^*(k+N).$$

The process now investigates windows having a size equal to the OFDM symbol duration (i.e., time), which depends on the transmission mode. As previously mentioned, the choice of the transmission mode will affect the value of the FFT size and hence, will affect the window size that is being investigated. For example, for transmission mode I, the FFT size is 2,048 samples and the window size is 2,552 samples. The different FFT and window sizes are readily available in the DMB standard. Preferably, the peaks in the output of the correlation/moving average process are not very close to the edge of the window. If this occurs, and a Null is present, the Null will be spread over two OFDM symbols and it will be very difficult to detect the Null presence.

Figure 2B:
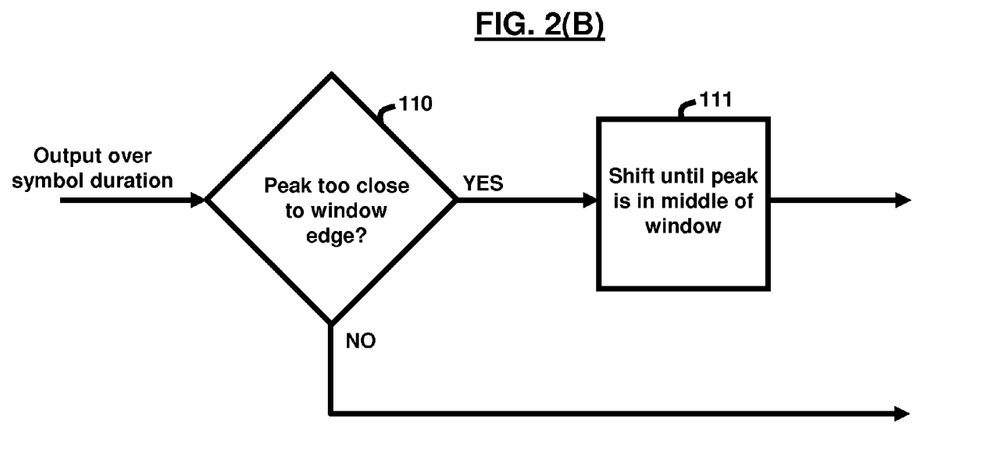
Figure 3A:
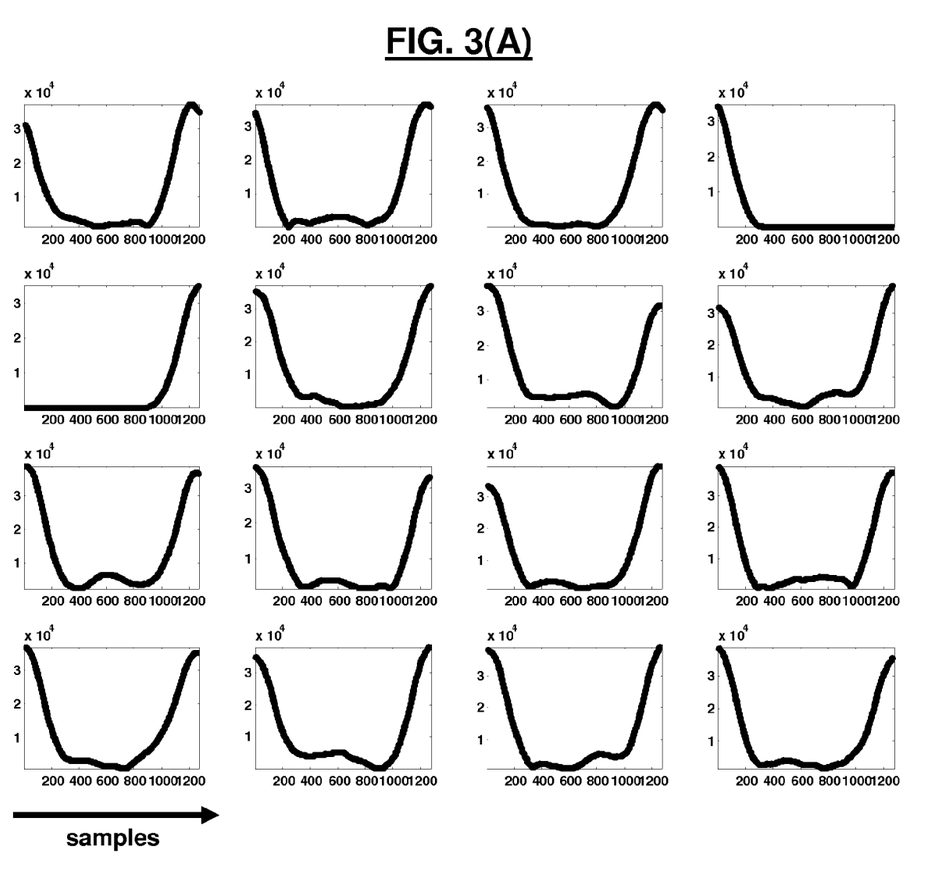
FIGS. 3(A) and 3(B) are graphical representations of several windows illustrating the output of the correlation/moving average process according to a first embodiment herein.
Figure 3B:
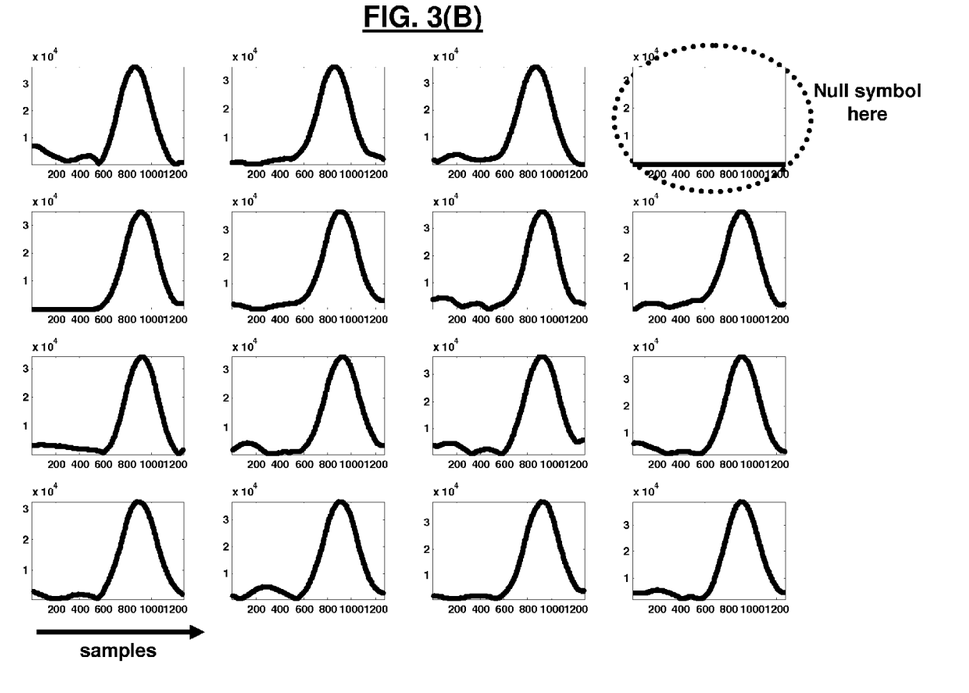

Consequently, as indicated in FIG. 2(B), the method provided by the first embodiment checks (110) the location of the peaks in the first two windows of a window buffer (shown in FIGS. 3(A) and 3(B) where a number of windows (for example 16) of the correlator/moving average process are investigated). If the peak location is too close to the edge (Yes), then the input stream of samples of OFDM symbols is disregarded for some time until the peaks are guaranteed to be within the "middle" of the window. In this regard, if the input stream of OFDM symbols 5 (of FIG. 1) are disregarded for some time; for example, 5-7 times the difference between the lengths of the NULL symbol and the OFDM data symbol 5, then it can be guaranteed that the peak of the new window (which will be calculated just after this wait period) will lie very close to the middle of the window. The middle of the window is a value approximately 50% of the window size under consideration. Effectively, the edges of the window of interest are being shifted (111) such that the peak lies within the "middle" of the window.

By disregarding the input stream for some time, the process effectively drops a number of samples of this output. Hence, the next time the process begins calculating the window output, the new peak now will be within the middle of the window. If the location of the peaks are not too close to the edge (No), then the process proceeds to the next step in the process. FIG. 3(A) shows an example of the output of the correlator/moving average where the peaks lie close to the edge of the window and the result of shifting the output of the correlator/moving average is shown in FIG. 3(B). In this regard, the peak is considered close to the edge if it lies within the first or last 25% of the window.

Figure 4:
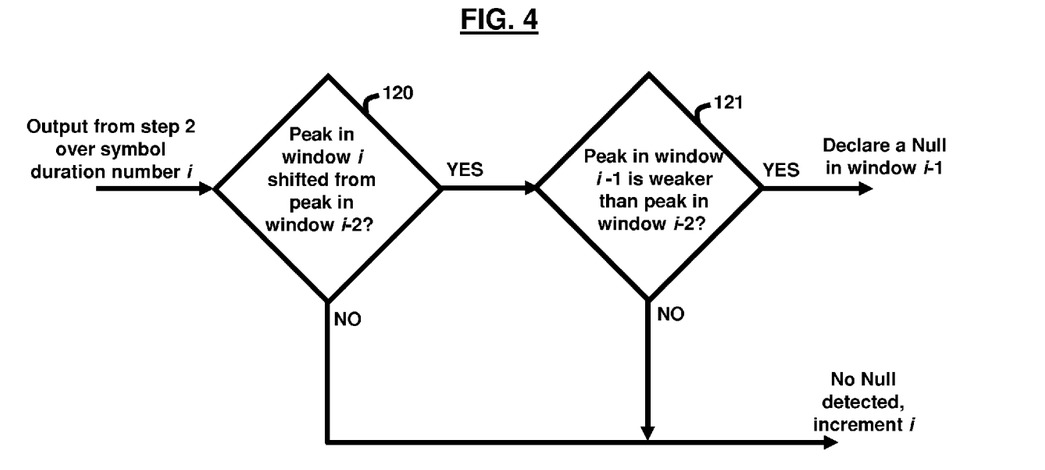
FIG. 4 is a block diagram illustrating a final step of Null detection according to a first embodiment herein.

Now, with reference to FIGS. 3(A) through 4, starting from window #4 in FIG. 3(B), the method investigates if a shift (120) has occurred in the location of the peak of the current window (window #4) as compared to that in the window before the last one (window #2). In the same time, the method checks (121) whether the value of the peak in the previous window (window #3) is "weak" compared to that in the two windows before the last one (windows #1 and #2). The peak of window #3 is said to be weak compared to those in windows #1 and #2 if its absolute value is less than or equal to 50% of the absolute value of the minimum of the peaks in windows #1 and #2. If both conditions are satisfied (Yes), a Null is declared to be detected in the previous window (window #3). If one or both of the conditions are not satisfied (No), then a Null is not detected. This process is summarized in FIG. 4.

The second embodiment can be summarized in the following steps. The first step is similar to that of the first embodiment. The only difference is that the length of the moving average window is selected to be double the length of the guard interval (cyclic prefix). This second embodiment may generate more accurate results compared to the first embodiment, but it uses a complete frame to get the Null symbol.

Figure 5:
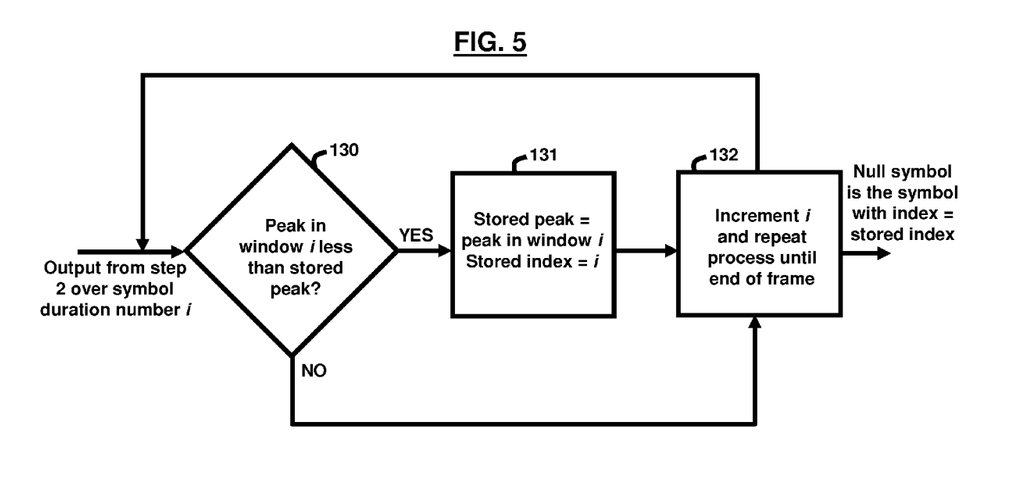
FIG. 5 is a block diagram illustrating a final step of Null detection according to a second embodiment herein.

In the second step, a "real" peak is detected by finding the maximum point in the output of the moving window filter, for a period not less than three symbol durations. This real peak becomes the center of the first symbol window, and its value is stored along with the index i=1. Following that, as shown in FIG. 5, the peak for each successive window is found and compared (130) to the stored one. If the peak is greater than the stored one (No), then it is stored instead along with the index of its window. Otherwise (Yes), the stored value is left as is (131). This process is repeated (132) for all the symbols in the DMB frame and the window whose index is stored at the end of the process is declared as the Null symbol.

Figure 6:
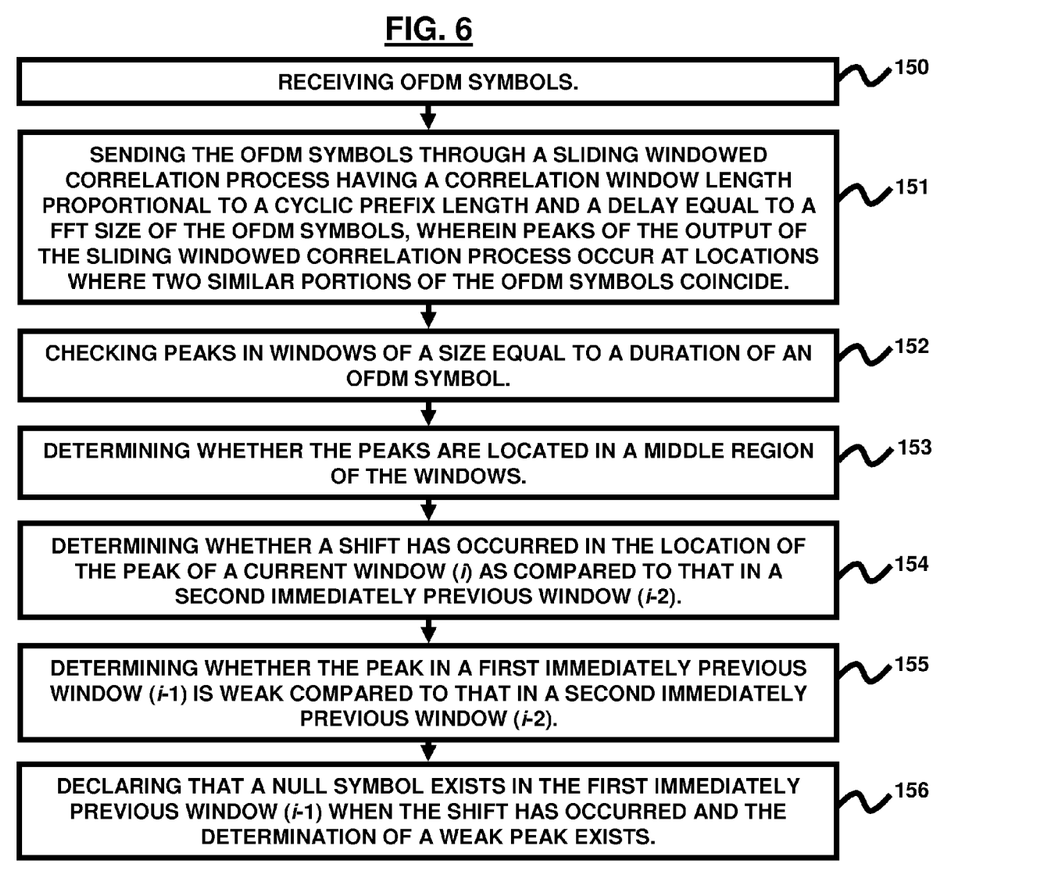
FIG. 6 is a flow diagram illustrating a preferred method according to an embodiment herein.

FIG. 6, with reference to FIGS. 1 through 5, is a flow diagram illustrating a method of detecting Null symbols in a video data frame according to an embodiment herein. The method comprises receiving (150) OFDM symbols 5; sending (151) the OFDM symbols 5 through a sliding windowed correlation process having a correlation window length proportional to a cyclic prefix length and a delay equal to a FFT size of the OFDM symbols 5, wherein peaks of the output of the sliding windowed correlation process occur at locations where two similar portions of the OFDM symbols 5 coincide; checking (152) peaks in windows of a size equal to a duration of an OFDM symbol 5; determining (153) whether the peaks are located in a middle region of the windows; determining (154) whether a shift has occurred in the location of the peak of a current window (i) as compared to that in a second immediately previous window (i-2); determining (155) whether the peak in a first immediately previous window (i-1) is weak compared to that in a second immediately previous window (i-2); and declaring (156) that a Null symbol exists in the first immediately previous window (i-1) when the shift has occurred and the determination of a weak peak exists.

In one embodiment, the window where the peaks are checked consist of the first two windows. Moreover, the method may further comprise shifting edges of the windows to ensure the peaks lie within the middle region of the windows. In one embodiment, the correlation window length is equal to the cyclic prefix length. In another embodiment, the correlation window length is double the cyclic prefix length. The checking process (152) may comprise detecting a maximum peak in the current window for a period not less than three symbol durations, wherein the method may further comprise establishing the maximum peak as a center of the current window; and finding peaks in all successive windows for a number of data symbols equal to the number of symbols in the video data frame. Additionally, the method may further comprise locating a window with a minimum value of the peak; and establishing the window with the minimum value of the peak as the Null symbol.

The embodiments herein can take the form of an entirely hardware embodiment, an entirely software embodiment or an embodiment including both hardware and software elements. Preferably, the embodiments implemented in software include but are not limited to firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
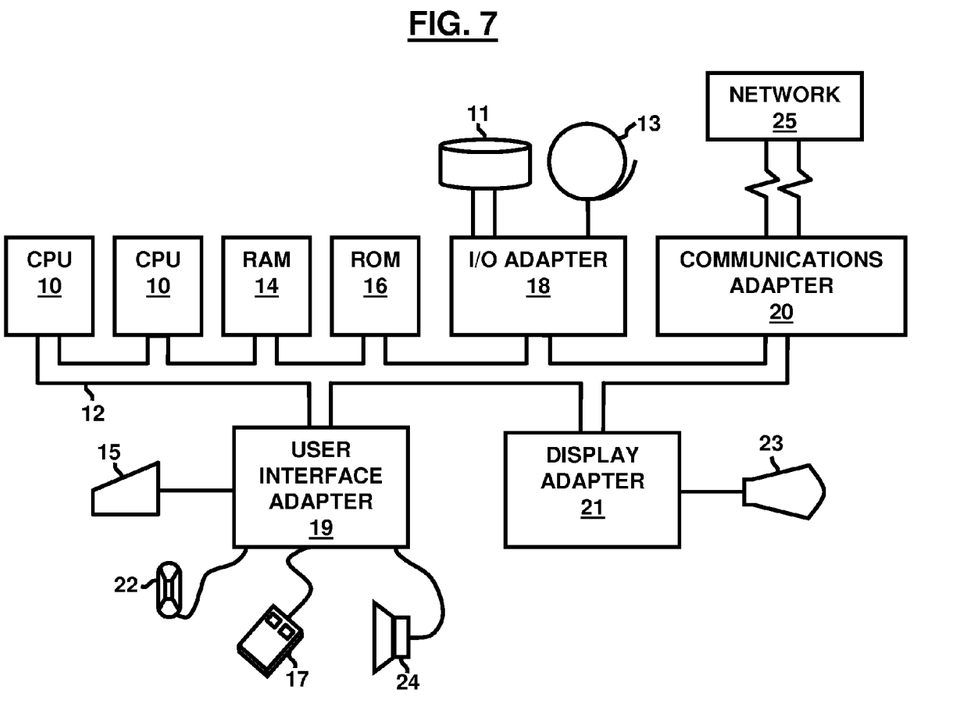
FIG. 7 is a schematic diagram of a computer system according to an embodiment herein.

A representative hardware environment for practicing the embodiments herein is depicted in FIG. 7. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of detecting Null symbols in a video data frame, said method comprising:
    receiving orthogonal-frequency-division-multiplexing (OFDM) symbols;
    sending said OFDM symbols through a sliding windowed correlation process having a correlation window length proportional to a cyclic prefix length and a delay equal to a Fast Fourier Transform (FFT) size of said OFDM symbols, wherein peaks of the output of the sliding windowed correlation process occur at locations where two similar portions of said OFDM symbols coincide;
    checking peaks in windows of a size equal to a duration of an OFDM symbol;
    determining whether said peaks are located in a middle region of said windows;
    determining whether a shift has occurred in the location of said peak of a current window (i) as compared to that in a second immediately previous window (i-2);
    determining whether said peak in a first immediately previous window (i-1) is weak compared to that in a second immediately previous window (i-2); and
    declaring that a Null symbol exists in said first immediately previous window (i-1) when said shift has occurred and said determination of a weak peak exists.

2. The method of claim 1, wherein said window where said peaks are checked consist of the first two windows.

3. The method of claim 1, further comprising shifting edges of said windows to ensure said peaks lie within said middle region of said windows.

4. The method of claim 1, wherein said correlation window length is equal to said cyclic prefix length.

5. The method of claim 1, wherein said correlation window length is double said cyclic prefix length.

6. The method of claim 1, wherein the checking process comprises detecting a maximum peak in said current window for a period not less than three symbol durations, wherein said method further comprises:
    establishing said maximum peak as a center of said current window; and
    finding peaks in all successive windows for a number of data symbols equal to the number of symbols in said video data frame.

7. The method of claim 6, further comprising:
    locating a window with a minimum value of said peak; and
    establishing said window with said minimum value of said peak as said Null symbol.

8. A program storage device readable by computer comprising a program of instructions executable by said computer to perform a method of detecting Null symbols in a video data frame, said method comprising:
    receiving orthogonal-frequency-division-multiplexing (OFDM) symbols;
    sending said OFDM symbols through a sliding windowed correlation process having a correlation window length proportional to a cyclic prefix length and a delay equal to a Fast Fourier Transform (FFT) size of said OFDM symbols, wherein peaks of the output of the sliding windowed correlation process occur at locations where two similar portions of said OFDM symbols coincide;
    checking peaks in windows of a size equal to a duration of an OFDM symbol;
    determining whether said peaks are located in a middle region of said windows;
    determining whether a shift has occurred in the location of said peak of a current window (i) as compared to that in a second immediately previous window (i-2);
    determining whether said peak in a first immediately previous window (i-1) is weak compared to that in a second immediately previous window (i-2); and
    declaring that a Null symbol exists in said first immediately previous window (i-1) when said shift has occurred and said determination of a weak peak exists.

9. The program storage device of claim 8, wherein said window where said peaks are checked consist of the first two windows.

10. The program storage device of claim 8, further comprising shifting edges of said windows to ensure said peaks lie within said middle region of said windows.

11. The program storage device of claim 8, wherein said correlation window length is equal to said cyclic prefix length.

12. The program storage device of claim 8, wherein said correlation window length is double said cyclic prefix length.

13. The program storage device of claim 8, wherein the checking process comprises detecting a maximum peak in said current window for a period not less than three symbol durations, wherein said method further comprises:
    establishing said maximum peak as a center of said current window; and
    finding peaks in all successive windows for a number of data symbols equal to the number of symbols in said video data frame.

14. The program storage device of claim 13, further comprising:
    locating a window with a minimum value of said peak; and
    establishing said window with said minimum value of said peak as said Null symbol.

15. A system for detecting Null symbols in a video data frame, said system comprising:
    a receiver adapted to receive orthogonal-frequency-division-multiplexing (OFDM) symbols;
    a sliding window correlator adapted to process said OFDM symbols, wherein said sliding window correlator comprises a correlation window length proportional to a cyclic prefix length and a delay equal to a Fast Fourier Transform (FFT) size of said OFDM symbols, wherein peaks of the output of the sliding windowed correlation process occur at locations where two similar portions of said OFDM symbols coincide; and
    a processor adapted to:
        check peaks in windows of a size equal to a duration of an OFDM symbol;
        determine whether said peaks are located in a middle region of said windows;
        determine whether a shift has occurred in the location of said peak of a current window (i) as compared to that in a second immediately previous window (i-2);
        determine whether said peak in a first immediately previous window (i-1) is weak compared to that in a second immediately previous window (i-2); and
        declare that a Null symbol exists in said first immediately previous window (i-1) when said shift has occurred and said determination of a weak peak exists.

16. The system of claim 15, wherein said window where said peaks are checked consist of the first two windows.

17. The system of claim 15, wherein said processor is further adapted to shift edges of said windows to ensure said peaks lie within said middle region of said windows.

18. The system of claim 15, wherein said correlation window length is equal to said cyclic prefix length.

19. The system of claim 15, wherein said correlation window length is double said cyclic prefix length.

20. The system of claim 15, wherein the checking process comprises detecting a maximum peak in said current window for a period not less than three symbol durations, wherein said process is further adapted to:

establish said maximum peak as a center of said current window;

find peaks in all successive windows for a number of data symbols equal to the number of symbols in said video data frame;

locate a window with a minimum value of said peak; and establish said window with said minimum value of said peak as said Null symbol.

* * * * *

UNITED STATES PATENT AND TRADEMARK OFFICE
CERTIFICATE OF CORRECTION

PATENT NO.         : 7,729,435 B2
APPLICATION NO.    : 11/834712
DATED              : June 1, 2010
INVENTOR(S)        : Mahmoud H. Ismail et al.

It is certified that error appears in the above-identified patent and that said Letters Patent is hereby corrected as shown below:

On the title page, next to the listing for the Inventors Item [75]: please delete "Youris" and in its place, please insert --Younis--.

Signed and Sealed this

Sixth Day of July, 2010

David J. Kappos
*Director of the United States Patent and Trademark Office*